United States Patent
Perut et al.

(10) Patent No.: US 6,994,030 B2
(45) Date of Patent: Feb. 7, 2006

(54) PYROTECHNIC MICROACTUATORS FOR MICROSYSTEMS

(75) Inventors: Christian Perut, St. Fargeau Ponthierry (FR); Denis Roller, La Ferte Alais (FR)

(73) Assignee: SNPE Materlaux Energetiques, Paris (FR)

( * ) Notice: Subject to any disclaimer, the term of this patent is extended or adjusted under 35 U.S.C. 154(b) by 0 days.

(21) Appl. No.: 10/471,632

(22) PCT Filed: Apr. 23, 2002

(86) PCT No.: PCT/FR02/01382

§ 371 (c)(1),
(2), (4) Date: Sep. 12, 2003

(87) PCT Pub. No.: WO02/088551

PCT Pub. Date: Nov. 7, 2002

(65) Prior Publication Data

US 2004/0144242 A1 Jul. 29, 2004

(30) Foreign Application Priority Data

Apr. 27, 2001 (FR) ............................................. 01 05715
May 31, 2001 (FR) ............................................. 01 07142

(51) Int. Cl.
*F42B 3/10* (2006.01)

(52) U.S. Cl. ................. 102/202.5; 102/202.9; 102/205; 102/275.11; 280/741

(58) Field of Classification Search .............. 102/202.5, 102/202.7, 202.9, 205, 275.11; 280/741
See application file for complete search history.

(56) References Cited

U.S. PATENT DOCUMENTS

| | | | |
|---|---|---|---|
| 3,483,695 A | 12/1969 | Olsen | |
| 4,111,221 A | 9/1978 | Olsen | |
| 5,370,147 A | 12/1994 | Brusse et al. | |
| 6,160,243 A | 12/2000 | Cozad | |
| 6,397,595 B2 * | 6/2002 | Benoit et al. | 60/512 |
| 2003/0005690 A1 * | 1/2003 | Neuf et al. | 60/404 |
| 2003/0165724 A1 * | 9/2003 | Delapierre | 429/19 |
| 2003/0168097 A1 * | 9/2003 | Delapierre | 137/68.13 |
| 2004/0049151 A1 * | 3/2004 | Lell | 604/72 |

FOREIGN PATENT DOCUMENTS

| | | | |
|---|---|---|---|
| DE | 10029325 | * | 6/2000 |
| WO | WO 98/22719 | | 5/1998 |
| WO | WO 98/31409 | * | 7/1998 |

* cited by examiner

Primary Examiner—J. Woodrow Eldred
(74) Attorney, Agent, or Firm—Oliff & Berridge, PLC

(57) ABSTRACT

The technical field of the invention is that of microactuators designed for mechanical, chemical, electrical or thermal functions in microsystems, for microelectronic applications such as chips, or biomedical applications such as cards incorporating microfluidics. The invention concerns a microactuator comprising a chamber machined in a solid support and containing a pyrotechnic charge. Said microactuator is essentially characterised in that the chamber is partly delimited by a deformable membrane, such that the gases emitted by combustion of the pyrotechnic charge enable to increase the volume of said chamber by deforming said membrane while maintaining intact the solid walls of the chamber.

16 Claims, 5 Drawing Sheets

PYROTECHNIC MICROACTUATORS FOR MICROSYSTEMS

The technical field of the invention is that of microactuators intended to perform mechanical, chemical, electrical, thermal or fluidic functions in microsystems, for microelectronics applications such as chips or biomedical applications such as analysis cards incorporating microfluids technology or chemical synthesis applications such as microreactors.

Microactuators are miniaturized objects machined in solid supports that may be semiconductors or insulators, with a view to forming microsystems such as, for example, microvalves or micropumps in fluid microcircuits, or microswitches in electronic microcircuits.

Microactuators using electrostatic, piezoelectric, electromagnetic and biometallic effects have been in existence for some time now. A new generation of microactuator is just beginning to appear: those employing a pyrotechnic effect. On this subject, patent WO 98/24719 describes a miniature valve for filling the reservoir of a transdermal administration appliance. The principle of operation of this valve relies on the fragmentation of a substrate caused by the gases of combustion of a pyrotechnic charge, said substrate initially separating a reserve of fluid from an empty reservoir. This microvalve may, according to another alternative form of embodiment of the invention, be used with an inflatable envelope. The combustion gases first of all rupture the substrate then inflate the envelope with a view to driving a fluid out. These microvalves have the twofold disadvantage of emitting fragments of substrate into the microcircuit and of mixing the combustion gases with the fluid they are supposed to release.

In general, the microactuators used in microcircuits need to offer good performance in terms of the forces they deliver, to maintain a small size, and to remain an entire and autonomous entity while they are operating, without the possibility of breaking into pieces in order to avoid emitting particles into the microcircuit into which they are built, and without the possibility of the combustion gases contaminating said microcircuit. In the case of a fluid microcircuit, the addition of pyrotechnics allows the microactuators to generate pressure forces 100 to 1000 times as high as those produced by microactuators operating on a piezoelectric or electrostatic source. In addition, the gases emitted by the combustion of the pyrotechnic charge may also serve to heat a fluid or part of a micromechanism without mixing with it.

The microactuators according to the invention meet these three requirements.

The subject of the present invention is a microactuator comprising a chamber produced in a solid support and containing a pyrotechnic charge, characterized in that the chamber is partially delimited by a deformable membrane so that the gases emitted by the combustion of the pyrotechnic charge allow the volume of said chamber to increase by deforming said membrane, while at the same time leaving the solid walls of the chamber intact.

In other words, the gases emitted by the combustion of the pyrotechnic charge have no influence on the geometry of the solid part of the chamber, either in terms of deforming the walls or in terms of fragmenting them.

These microactuators may by themselves perform functions within a microcircuit, such as, for example, exerting pressure on a fluid to help displace it in order to remove it, or closing a fluid duct by deforming the membrane, but they are more usually intended to be included in microsystems.

A microsystem is a miniaturized multifunction device, the maximum dimensions of which do not exceed a few millimeters. In the case of a fluid microcircuit, a microsystem may, for example, be a microvalve or a micropump and, in the context of an electronic microcircuit, may be a microswitch or a microbreaker. Microactuators are produced in semiconductor supports, such as those made of silicon for example, in the case of a microelectronics application. They may be designed in other materials, such as polycarbonate, for other applications, particularly in the biomedical field. The configuration of the chamber is such that, under the effect of the gases emitted by the combustion of the pyrotechnic charge, it increases in volume. The chamber may contain several pyrotechnic charges, not with a view to increasing the internal pressure in said chamber by firing said charges simultaneously, but so as to maintain a pressure level that is fairly constant over time in order to guard against possible premature relaxation of the chamber, particularly in the case of micropumps. In this case, the charges are initiated sequentially, at predetermined time intervals. As a preference, said chamber defines a hermetic space once it has expanded. In other words, once combustion is over, the chamber remains in a configuration corresponding to a state of maximum expansion.

Advantageously, the pyrotechnic charge consists of a composition based on nitrocellulose. What actually happens is that because of the very small size of the pyrotechnic charges used, their mass not exceeding a few micrograms, it is particularly desirable for homogeneous compositions to be used.

According to another preferred embodiment of the invention, the pyrotechnic charge consists of glycidyl polyazide.

As a preference, the volume of the chamber is less than 1 cm$^3$. Advantageously, the fill density, which is the ratio of the mass of the pyrotechnic charge to the volume of the chamber, is between 0.01 $\mu$g/mm$^3$ and 0.1 mg/mm$^3$. For a given chamber volume it is entirely possible to define a pyrotechnic charge, in terms of mass, geometry and composition, that is able to produce a given amount of energy.

According to a first preferred embodiment of the invention, the pyrotechnic charge is deposited on a heating conducting track and advantageously has a deposition thickness of less than 200 $\mu$m.

According to a second preferred embodiment of the invention, the pyrotechnic charge coats a heating conducting wire passing through the chamber, the diameter of said wire being between 10 $\mu$m and 100 $\mu$m. Although these two modes of initiation in most cases allow the pyrotechnic charge to be fired, it has, however, been found that in certain configurations there is a problem associated with thermal losses by conduction due to the heating conducting element's coming into contact with the support, these losses requiring additional energy in order to be able to fire the charge, this generally being accompanied by significant heating of the microactuator, which is not always desirable. Thus, in a third preferred embodiment of the invention, the heating conducting track is deposited on the pyrotechnic charge using techniques that have been widely proven in the field of microcircuits such as, for example, the deposition of paint or conducting ink by screen printing or inkjet printing, so as to avoid any direct contact between said conducting track and the substrate. According to a fourth preferred embodiment of the invention, the chamber has a cavity hollowed into the support and said pyrotechnic charge is in the form of a film covering said cavity in order, here, again, to reduce or even eliminate thermal losses by conduction by isolating the pyrotechnic charge from any heat-conducting solid support. For this last configuration, use may be made of high-energy materials with a film-forming capability, such as collodion for example.

However, the optimized configuration for best solving the problem associated with thermal losses by conduction is to deposit the pyrotechnic charge in the form of a film over a cavity of the support and to fire it using a heating conducting track that is itself deposited on said charge. By doing this, direct contact between the heating track and the support are non-existent and those between the charge and said support are almost non-existent.

Because of the miniaturizing of the pyrotechnic charge, its firing system has itself to be of small bulk, while at the same time remaining highly reliable. More generally, it is also possible to fire the pyrotechnic charge using other means, particularly those involving either a piezoelectric crystal, or a striker, provided that they meet the twofold requirement of miniaturization and reliability, or using a laser beam, pyrotechnic energy [lacuna] along a waveguide or an optical fiber.

As a preference, the chamber is partially delimited by a flexible membrane able to inflate under the effect of the gases emitted by the pyrotechnic charge. The extendibility properties of the membrane may differ according to the requirements associated with the use of the actuator.

According to another preferred embodiment of the invention, the chamber is partially delimited by a flexible membrane folded in said chamber, said membrane being able to unfold under the effect of the gases emitted by the pyrotechnic charge. Depending on the configuration, the membrane may either be folded onto itself, or folded up in the chamber. Advantageously, once the membrane is unfolded under the effect of the gases, the final volume of the chamber is greater than its initial volume. As a preference, the membrane is made of Teflon. Advantageously, for microelectronics applications, the membrane may be entirely or partially covered with a conducting material.

The invention also relates to a microsystem including a microactuator according to the invention, characterized in that the deformation of the membrane causes a solid part to move. Indeed the gases emitted by the combustion of the pyrotechnic charge create a raised pressure in the chamber, which will tend to expand by deformation of the membrane. The membrane then comes into contact with a part placed near the microactuator, and when the pressure forces reach a threshold value they cause said part to move.

According to a first preferred embodiment of a microsystem according to the invention, the solid part is able to obstruct a fluid duct after the pivoting of said part under the effect of the combustion gases. For this configuration, in which the microactuator is used in the context of a fluid microcircuit, the microsystem may be likened to a closure microvalve.

According to a second preferred embodiment of the invention, the solid part closes off a fluid duct and the movement of said part by pivoting causes said duct to open. For this configuration, the microsystem may be likened to an opening microvalve.

According to a third preferred embodiment of the invention,
i) a flexible membrane is situated in an annular space that may be likened to a groove,
ii) the pyrotechnic charge is situated in an annular space that may be likened to a groove smaller than the one in which the flexible membrane is situated and positioned concentrically with respect to that groove, the two grooves communicating with each other via at least one opening,
iii) a flat solid part bears against the support, covering the annular space in which the flexible membrane is situated, said part itself being covered by an elastic membrane and blocking off a fluid duct, so that the gases emitted by the combustion of the charge lead to deployment of the flexible membrane situated in the annular space and cause the flat part to move, causing fluid to be drawn up into the space that the elastic membrane creates as it moves away from the support.

For this configuration, the microsystem may be likened to a vacuum micropump and the use of several pyrotechnic charges fired in sequence may seem particularly appropriate, in order to maintain a minimum threshold pressure level for a certain length of time and thus avoid premature natural reflux of the fluid.

According to a fourth preferred embodiment of the invention, the membrane deforms under the effect of the combustion gases to obstruct a fluid duct. Advantageously, the chamber is partially delimited by a membrane that is bistable such that said membrane, initially concave, becomes convex under the effect of the gases emitted by the charge. For this configuration, the microsystem, which acts like a closure microvalve, moves no part and is coincident with the microactuator. Advantageously, the element that obstructs the fluid duct, whether this be the flat, solid part or the bistable membrane, is surmounted by a flexible protrusion to ensure a good seal at the closure of said duct, said protrusion being something that can be likened to a plug.

The microactuator according to the invention may be used in electronic microcircuits by contributing to the production of Microsystems such as microswitches or microbreakers. What happens is that the membrane that partially delimits the chamber and is entirely or partially covered with a conducting material can inflate or deploy in such a way as to close or to open an electric microcircuit. Likewise, the microactuator according to the invention equipped with a non-conducting flexible membrane can move a conducting solid part so as to close or to open an electric microcircuit or perform the dual function of first of all opening an electric microcircuit and then closing another one.

The pyrotechnic microactuators according to the invention have the advantage of having good performance and good reliability while at the same time remaining clean. They are clean in two respects: first, they remain intact throughout their phase of operation without the risk of being fragmented, avoiding the release of parasitic solid particles into the microcircuit, and second, the gases emitted by the pyrotechnic charge are trapped in the chamber, which delimits a gastight space, without any possibility of invading the microcircuit. In addition, the pyrotechnic microactuators according to the invention are simple. A chamber with a membrane, a pyrotechnic charge, and an ignition system are their only constituent elements, and the physico-chemical phenomena they generate remains basic.

Finally, for a given chamber volume, the great variation in pyrotechnic compositions that can be incorporated into the microactuators according to the invention makes it possible to obtain a very wide range of initiating arrangements, suiting it to a great many configurations.

A detailed description of a preferred embodiment of a microactuator according to the invention and of three preferred embodiments of a microsystem employing a microactuator according to the invention is given hereinafter with reference to FIGS. 1 to 7.

Figure 1:
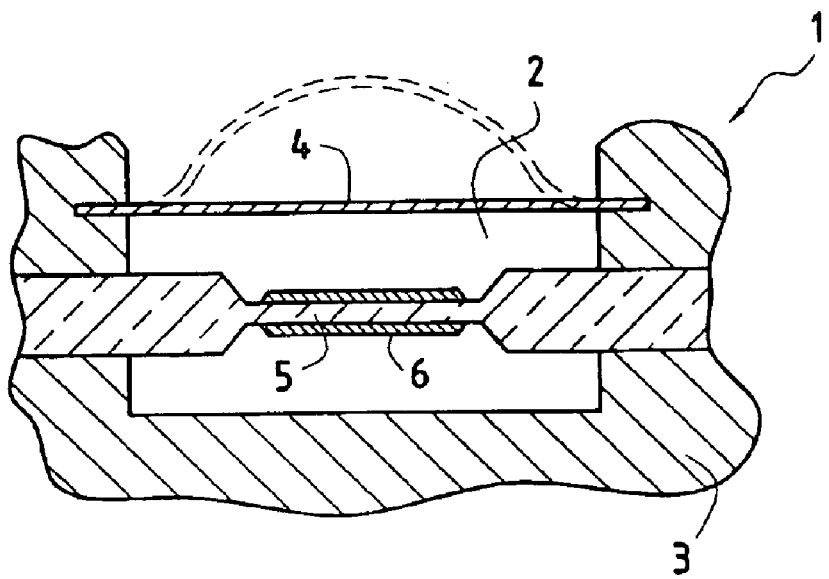
FIG. 1 is a view in longitudinal axial section of a microactuator according to the invention.

With reference to FIG. 1, a microactuator 1 according to the invention comprises a chamber 2 made in a polycarbonate support 3 and having a cylindrical shape. Said support 3 is the result of a stacking of polycarbonate sheets bonded together. Said chamber 2, which is therefore delimited by the support 3, has a circular face closed off by a flexible Teflon membrane 4 fixed in said support 3. Said chamber 2 has, passing through it, a heating wire 5 coated in a layer of pyrotechnic composition 6 based on nitrocellulose.

The mode of operation of this actuator 1 is as follows. An electric current is delivered to the heating wire 5, the temperature of which rises until it reaches the ignition temperature of the pyrotechnic composition 6. Combustion of said composition 6 leads to, the production of gases that create a raised pressure in the chamber 2. The membrane 4, which is thus stressed, reacts by inflating.

Figure 2:
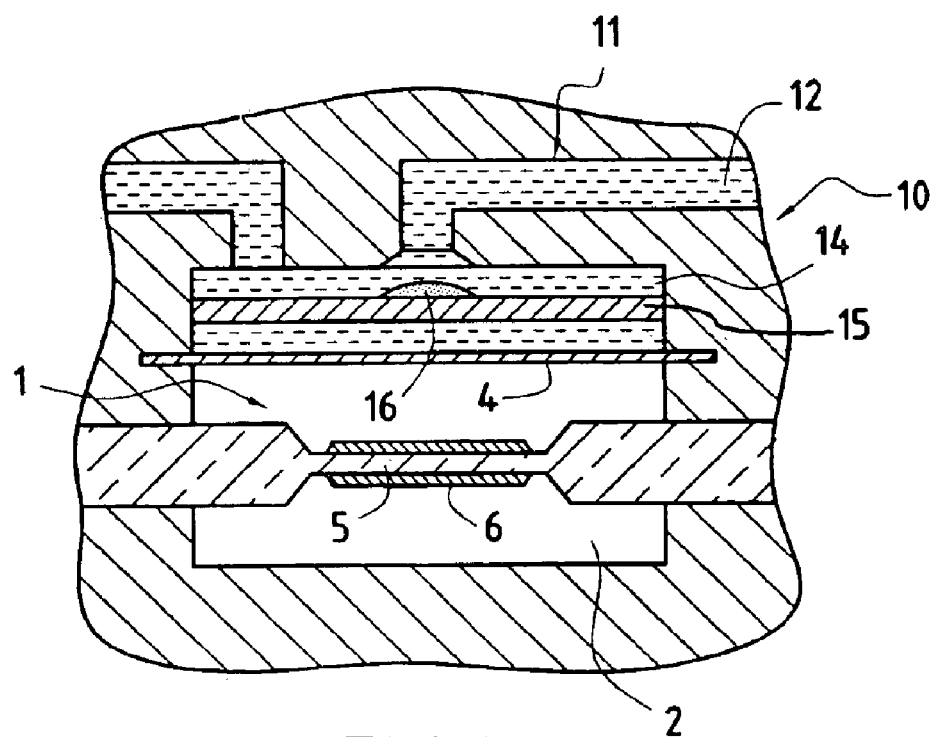
FIG. 2 is a view in longitudinal axial section of a closure microvalve operating using a pyrotechnic microactuator according to the invention.
Figure 3:
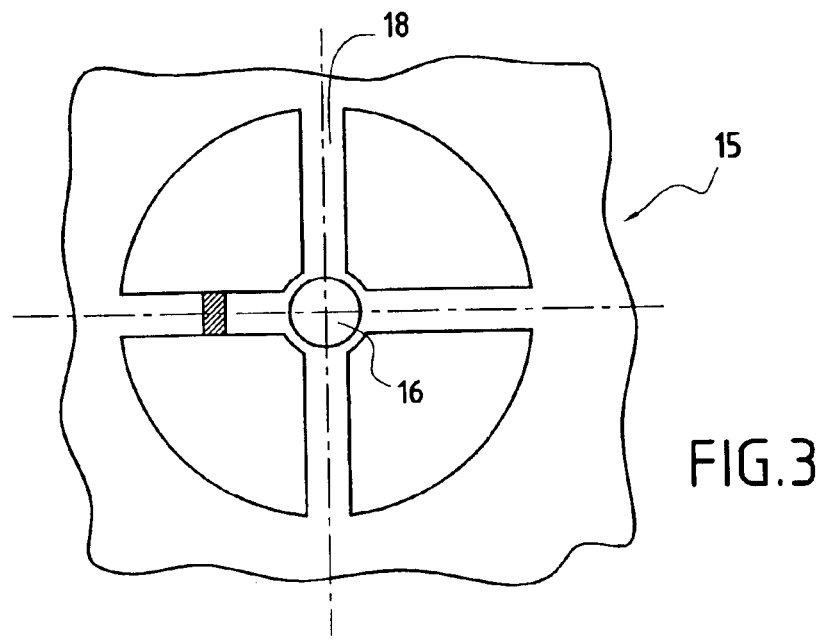
FIG. 3 is a view from above of the closure shutter of the microvalve of FIG. 2.

With reference to FIG. 2, a closure microvalve 10 is produced in a polycarbonate support and comprises a microactuator 1 similar to the one described in the previous paragraph and situated near a fluid microcircuit 11 characterized by a straight duct 12 passing through a cylindrical chamber 14 situated in the continuation of the cylindrical chamber 2 of the microactuator 1 and having approximately the same diameter, the two chambers 2, 14 being separated from one another by the membrane 4 of the microactuator 1. The chamber 14 through which the duct 12 passes is filled with fluid and contains a closure shutter 15. With reference to FIG. 3, the shutter 15 consists of a rounded part 16 supported by four polycarbonate posts 18 between which the fluid flows, said posts 18 resting on the membrane 4. Said rounded part 16, which is made of a flexible material such as rubber, is therefore not in direct contact with the membrane 4. The volume of the chamber 2 is 0.3 cm$^3$ and the mass of the pyrotechnic charge 6 is 0.5 μg.

The mode of operation of this closure microvalve 10 is as follows. The firing of the pyrotechnic charge 6 leads to a raised pressure in the chamber 2 and this then causes the shutter 5 to move in terms of translation in a fluid-filled chamber 14. This movement continues until the flexible part 16 sits into the duct 12, interrupting the circulation of fluid. The part of the duct intended to take the flexible part 16 is slightly flared so as to seal the duct. Once the combustion of the pyrotechnic charge 6 is over, the shutter 15 does not return to its initial position because the chamber 2 defines a gastight space.

Figure 4:
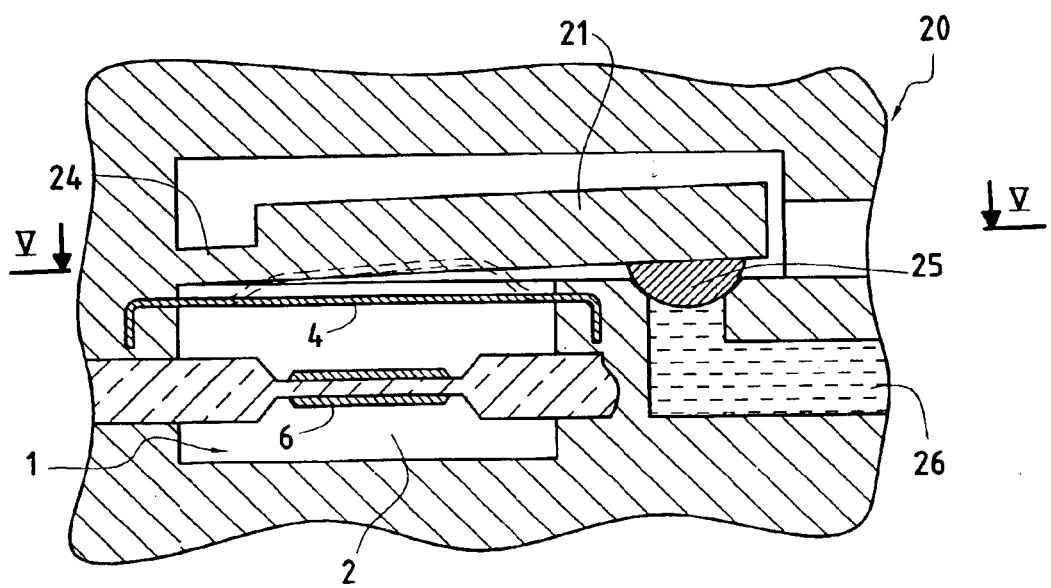
FIG. 4 is a view in longitudinal axial section of an opening microvalve operating using a pyrotechnic microactuator according to the invention.
Figure 5:
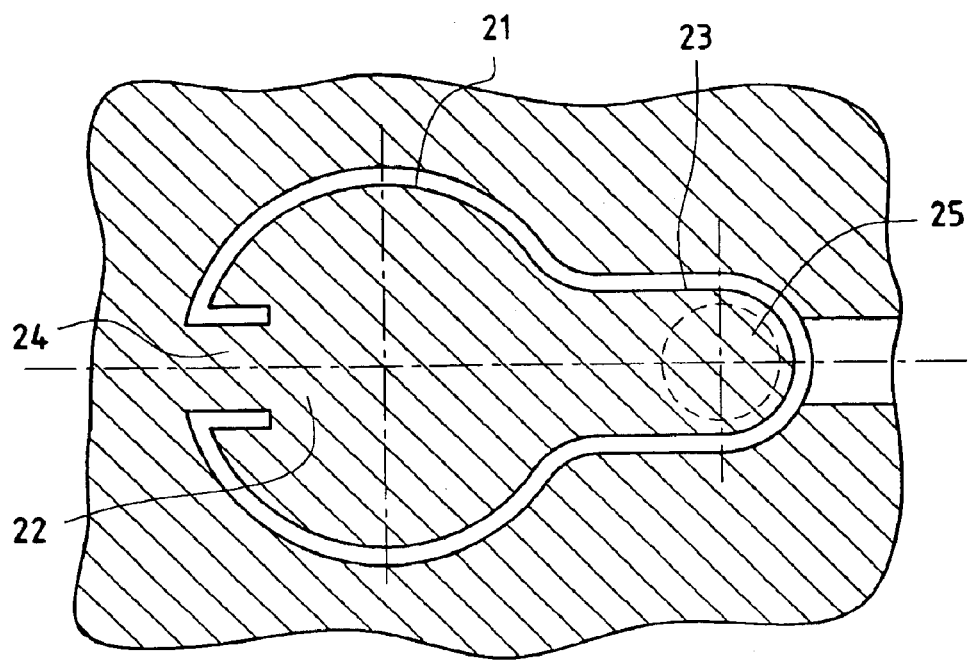
FIG. 5 is a view in section on V—V of the opening of the microvalve of FIG. 4.

With reference to FIG. 4, an opening microvalve 20 is produced in a polycarbonate support and comprises a microactuator 1 similar to the one described in the paragraph relating to FIG. 1 and situated near a fluid microcircuit. In close proximity to said microactuator 1, and more particularly to its membrane 4, there is a flexible leaf 21 of polycarbonate secured to the support made of the same material. With reference to FIG. 5, the flexible leaf 21 is a flat part of constant thickness, having a rounded body 22 extended by a narrower portion 23 with a rounded end. The leaf 21 is secured to the support via a tab 24, of lesser thickness, connecting said support to the end of the rounded body 22 of the leaf 21 furthest from the rounded end of the narrower portion 23 that extends it. The rounded end of said narrow portion 23 bears a flexible protrusion 25 of approximately hemispherical shape, said protrusion 25 plugging a duct 26. The force needed to maintain the sealing, even in the event of a backpressure due to the fluid in the duct 26, is obtained by an initial bending of the leaf 21.

The mode of operation of this opening microvalve 20 is as follows. The firing of the pyrotechnic charge 6 leads to a raised pressure in the chamber 2 and this then causes the membrane 4 to inflate and come to press against the flexible leaf 21. The pressure forces exerted on said leaf 21 cause it to pivot about the tab 24 connecting it to the support, allowing the duct 26 initially plugged by the protrusion 25 of said leaf 21 to open. As it moves, the leaf 21 remains rigid without deforming and therefore acts as a pivoting shutter.

Figure 6:
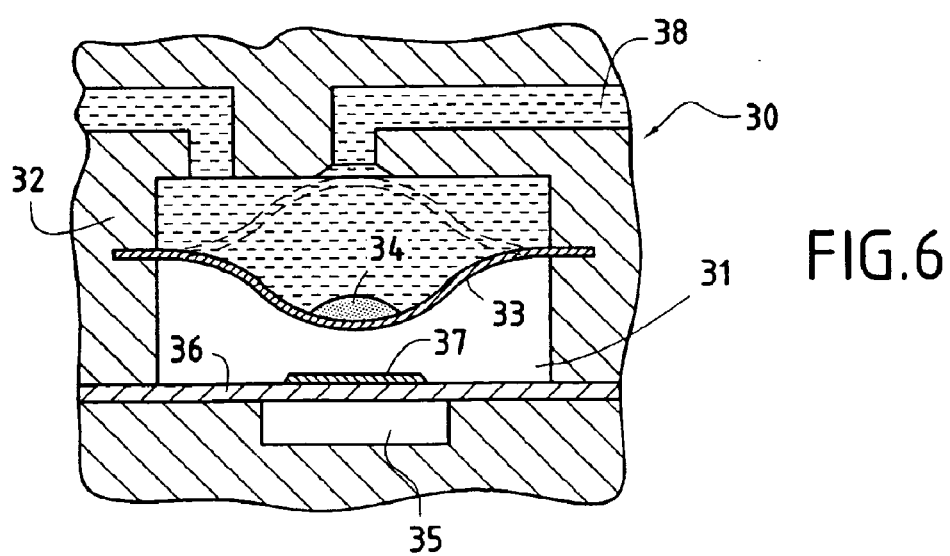
FIG. 6 is a view in longitudinal axial section of a closure microvalve using a pyrotechnic microactuator according to the invention equipped with a bistable membrane.

With reference to FIG. 6, one type of closure microvalve 30 comprises a chamber 31 machined in a polycarbonate support 32 and having a cylindrical shape. Said chamber 31, which is therefore delimited by the support 32, has a circular face plugged by a bistable membrane 33 of concave shape and having, at its center, on its external surface with respect to the chamber 31, a flexible hemispherical protrusion 34. The opposite face of the chamber 31 to that delimited by the membrane 33 has a central cylindrical recess 35, said face being covered with a conducting track 36. A pyrotechnic charge 37 of a small thickness and a length shorter than the diameter of the recess 35 is deposited on the surface of said track 36, in a position on the opposite side of the track 36 to said recess 35. The membrane 33 partially delimits a fluid-circulation path.

The mode of operation of this type of closure microvalve 30 is as follows.

The firing of the pyrotechnic charge 37 gives rise to a raised pressure in the chamber 31 and this causes the membrane 33 to invert and immediately adopt a convex shape, significantly increasing the volume of said chamber 31. The protrusion 34 sits into the fluid duct 38, interrupting the circulation of fluid. As the new convex shape of the membrane 33 is stable, the closure of the duct 38 remains permanent.

Figure 7:
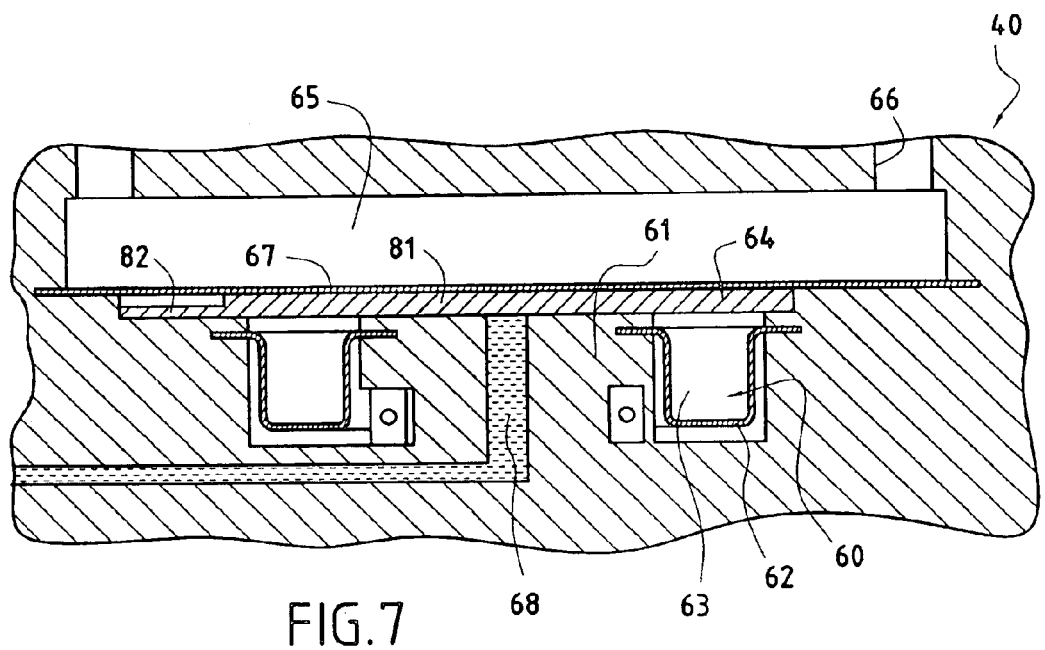
FIG. 7 is a view in longitudinal axial section of a micropump using a pyrotechnic microactuator according to the invention, said microactuator having not yet operated.
Figure 8:
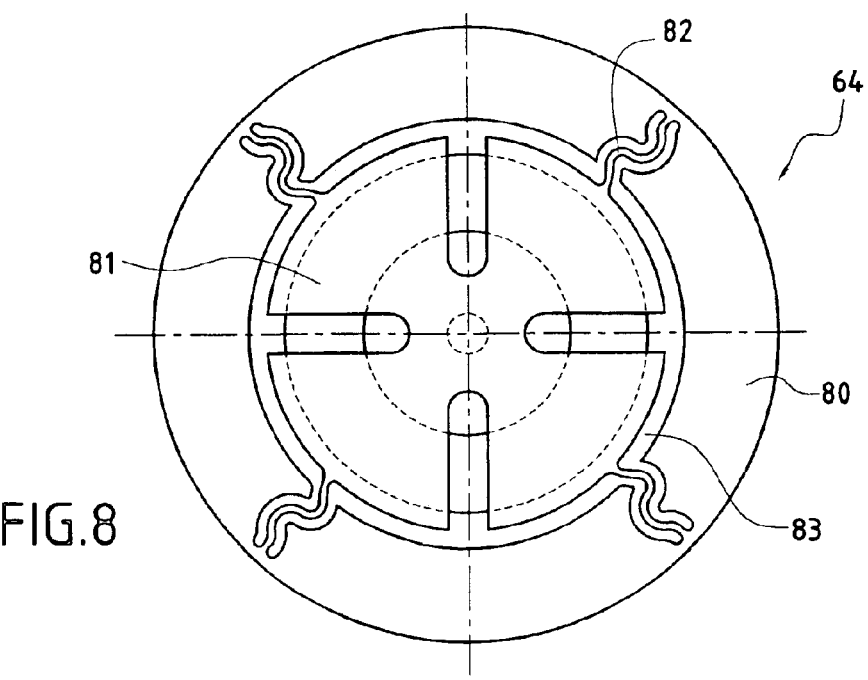
FIG. 8 is a view from above of the flat solid part to be moved and belonging to the micropump shown in FIG. 7.

With reference to FIG. 7, a vacuum micropump 40 comprises a microactuator 60 according to the invention, machined in a polycarbonate support 61 and comprising a flexible membrane 62 situated in an annular space 63 that can be likened to a groove. More specifically, said membrane 62 lines the bottom of the groove 63 and is fixed to said groove 63 at its upper part. A pyrotechnic charge is situated in an annular space that can be likened to a groove of a smaller size than the groove 63 in which the membrane 62 is situated and positioned concentrically with respect to the latter groove 63, the two grooves communicating with one another via four uniformly spaced openings on a circular wall separating the two grooves. The groove containing the pyrotechnic charge is buried within the support 61 while the groove 63 lined with the flexible membrane 62 is open at its upper part. A sheet 64 of the polycarbonate support 61 covers said groove 63. With reference to FIG. 8, said sheet 64 is cut in such a way that it consists of a flat peripheral annular band 80 connected to a flat central disk 81 by means of four S-shaped deformable strands 82. The central disk 81 completely covers the annular groove 63. Between said flat central disk 81 and the peripheral annular band 80 there is an empty annular space 83. Formed in the support 61 on the other side of the sheet 64 is an empty cylindrical space 65, the diameter of which is greater than that of said sheet 65, said space 65 having two vents 66. The sheet 64 is covered with an elastic membrane 67 of circular shape and of a diameter greater than that of the empty space 65 situated beyond said sheet 64. Said elastic membrane 67 is fixed in said empty space 65, in its part closest to the sheet 64. A fluid duct 68, hollowed into the support 61 at the central part of the groove containing the pyrotechnic charge, opens into the empty space 65 of said support 61.

Figure 9:
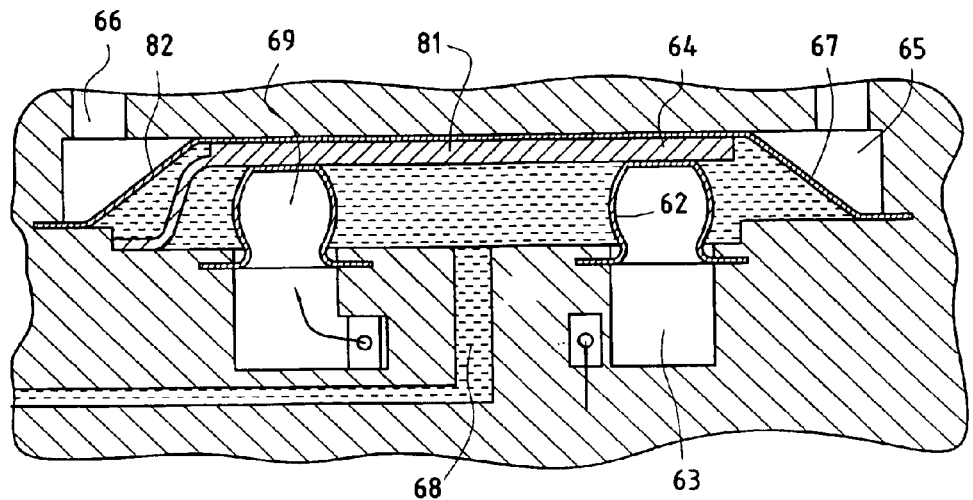
FIG. 9 is a view in longitudinal axial section of the micropump of FIG. 7, the microactuator having operated.

The mode of operation of this type of vacuum micropump is as follows. With reference to FIGS. 7, 8 and 9, the combustion of the pyrotechnic charge generates gases which, via the four openings, invade the outer groove 63 lined with the flexible membrane 62, which immediately begins an inversion phase to end up emerging from said groove 63, in which it lay, in the form of an inflated sausage 69. The formation of this sausage 69 leads to the movement of the disk 81 of the sheet 64. The movement of said disk 81 is made possible by virtue of the four S-shaped deformable strands 82 which stretch without breaking in order to maintain a connection with the annular band 80. Said movement causes fluid to be drawn into the space that the elastic membrane 67 creates as it moves away from the support 61. The elastic membrane 67 ensures a good seal of the space into which the fluid is drawn. The air in the space behind the elastic membrane 67 is discharged through the two vents 66 of the empty space 65, the volume of which continues to decrease.

Figure 10:
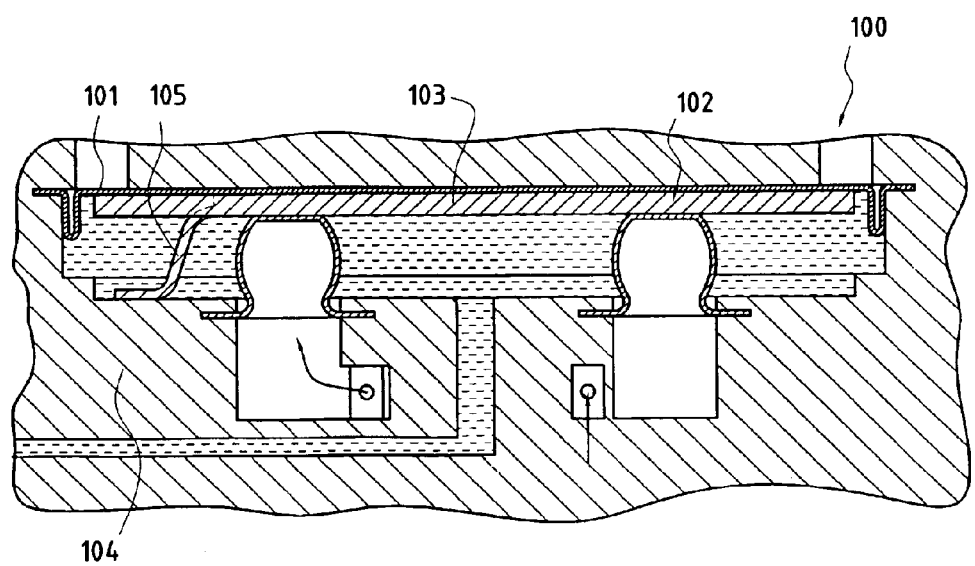
FIG. 10 is a view in longitudinal axial section of a second alternative form of embodiment of a micropump using a microactuator according to the invention, said microactuator having operated.

With reference to FIG. 10, a second alternative form of embodiment of a micropump 100 using a microactuator according to the invention differs from the micropump described hereinabove only in terms of the sheet 102 and of the membrane 101 that covers it. Specifically, the sheet 102 is in the form of a widened flat disk 103, the diameter of which is roughly equal to the cylindrical empty space corresponding to the one denoted via the reference 65 in FIG. 7 and situated on the other side of said sheet 102. Said disk 103 is connected to the support 104 by means of four S-shaped deformable strands 105. In this way, the membrane 101 covering the sheet 102 is fixed in said empty cylindrical space such that it completely lines said space, both the bottom and the internal side wall. Said membrane 101 is fixed in said space at its internal side wall at its part furthest from said sheet 102. The principle of operation of such a micropump 100 is similar to that described in respect of the first alternative form. The technical advantage conferred by such a configuration is a gain in volume of the space into which the fluid is drawn, because this space is more or less the space there is beyond the sheet 102 before the microactuator is operated.

The invention claimed is:

1. A microactuator comprising a chamber produced in the form of a cavity in a solid support and containing a pyrotechnic charge, said chamber being partially delimited by a deformable membrane so that the gases emitted by the combustion of the pyrotechnic charge allow the volume of said chamber to increase by deforming said membrane, while at the same time leaving the solid walls of the chamber intact, characterized in that the pyrotechnic charge is deposited on a heating conductor and has a deposition thickness of less than 200 $\mu$m.

2. The microactuator as claimed in claim 1, characterized in that the chamber has a cavity hollowed into the support and the pyrotechnic charge is in the form of a film covering said cavity.

3. The microactuator as claimed in claim 1, characterized in that the chamber defines a hermetic space once it has expanded.

4. The microactuator as claimed in claim 1, characterized in that the pyrotechnic charge consists of a composition based on nitrocellulose.

5. The microactuator as claimed in claim 1, characterized in that the volume of the chamber is less than 1 cm$^3$.

6. The microactuator as claimed in claim 1, characterized in that the fill density, which is the ratio of the mass of the pyrotechnic charge to the volume of the chamber, is between 0.01 $\mu$g/mm$^3$ and 0.1 mg/mm$^3$.

7. The microactuator as claimed in claim 1, characterized in that the chamber is partially delimited by a flexible membrane able to inflate under the effect of the gases emitted by the pyrotechnic charge.

8. The microactuator as claimed in claim 1, characterized in that the chamber is partially delimited by a folded flexible membrane in said chamber, said membrane being able to unfold under the effect of the gases emitted by the pyrotechnic charge.

9. The microactuator as claimed in claim 7, characterized in that the membrane is made of polyterafluoroethylene.

10. The microactuator as claimed in claim 1, characterized in that the pyrotechnic charge coats a heating conducting wire passing through the chamber, the diameter of said wire being between 10 $\mu$m and 100 $\mu$m.

11. A microsystem including a microactuator as claimed in claim 1, characterized in that the deformation of the membrane causes a solid part to move.

12. The microsystem as claimed in claim 11, characterized in that the solid part pivots under the effect of the combustion gases and obstructs a fluid duct.

13. The microsystem including a microactuator as claimed in claim 1, characterized in that:

i) a flexible membrane is situated in an annular groove, ii) the pyrotechnic charge is situated in an annular space that can be likened to a groove smaller than the one in which the flexible membrane is situated and positioned concentrically with respect to that groove, the two grooves communicating with each other via at least one opening, iii) a flat solid part bears against the support, covering the annular space in which the flexible membrane is situated, said part itself being covered by an elastic membrane and blocking off a fluid duct, so that the gases emitted by the combustion of the charge lead to deployment of the flexible membrane situated in the annular space and cause the flat part to move, causing fluid to be drawn up into the space that the elastic membrane creates as it moves away from the support.

14. The microsystem including a microactuator as claimed in claim 1, characterized in that the membrane deforms under the effect of the combustion gases to obstruct a fluid duct.

15. The microsystem as claimed in claim 14, characterized in that the chamber is partially delimited by a membrane that is bistable such that said membrane, initially concave, becomes convex under the effect of the gases emitted by the charge.

16. The microsystem as claimed in claim 12, characterized in that the element that obstructs the fluid duct is surmounted by a flexible protrusion to ensure a good seal at the closure of said duct.

* * * * *